(12) United States Patent
Yamamoto et al.

(10) Patent No.: US 9,789,753 B2
(45) Date of Patent: Oct. 17, 2017

(54) DOOR OF UTILITY VEHICLE AND UTILITY VEHICLE WITH THE DOOR

(71) Applicant: KAWASAKI JUKOGYO KABUSHIKI KAISHA, Hyogo (JP)

(72) Inventors: Teruaki Yamamoto, Kakogawa (JP); Kazumasa Hisada, Akashi (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 14/585,599

(22) Filed: Dec. 30, 2014

(65) Prior Publication Data

US 2016/0185192 A1   Jun. 30, 2016

(51) Int. Cl.
*B60J 5/04* (2006.01)

(52) U.S. Cl.
CPC ........... *B60J 5/0487* (2013.01); *B60J 5/0476* (2013.01)

(58) Field of Classification Search
CPC .............................. B60J 5/0487; E05B 85/045
USPC ..................................................... 296/146.9
See application file for complete search history.

(56) References Cited

U.S. PATENT DOCUMENTS

| 6,036,255 | A  | * | 3/2000  | Lester    | B60J 5/0416 296/146.1 |
| 6,134,841 | A  | * | 10/2000 | Schneider | B66F 9/07545 296/190.11 |
| 7,097,237 | B2 | * | 8/2006  | Weiner    | B60J 5/0487 280/749 |
| 7,988,210 | B2 | * | 8/2011  | Shibata   | B60J 5/0487 16/82 |
| 8,328,235 | B2 | * | 12/2012 | Schneider | B60J 5/0487 280/748 |
| 8,465,050 | B1 | * | 6/2013  | Spindler  | B60R 21/06 280/749 |
| 9,073,412 | B2 | * | 7/2015  | Dobrot    | B60J 5/0487 |
| 9,475,367 | B1 | * | 10/2016 | Wilson, III | B60J 5/0487 |
| 2011/0062748 | A1 | * | 3/2011  | Kaita     | B60J 5/0487 296/146.9 |
| 2012/0161468 | A1 | * | 6/2012  | Tsumiyama | B60J 5/0487 296/146.11 |
| 2014/0292021 | A1 | * | 10/2014 | Kuroda    | B60J 5/0487 296/146.5 |

* cited by examiner

*Primary Examiner* — Pinel Romain
(74) *Attorney, Agent, or Firm* — Wenderoth, Lind & Ponack, L.L.P.

(57) ABSTRACT

A door of a utility vehicle includes a door body including a grip portion utilized for opening and closing the door, an attachment portion provided to the door body, and a replaceable portion detachably attached to the attachment portion and enabling visual recognition from inside to outside the vehicle.

9 Claims, 7 Drawing Sheets

DOOR OF UTILITY VEHICLE AND UTILITY VEHICLE WITH THE DOOR

BACKGROUND OF THE INVENTION

1. Field of the Invention

The present invention relates to a door of a utility vehicle and a utility vehicle including the door.

2. Description of the Related Art

A conventional door of a utility vehicle partitions only the lower half between a riding space and a lateral outside of the vehicle, and does not partition the upper half. When the door is closed, hot air tends to be contained in the vehicle and particularly in the lower portion of the vehicle. For example in winter, outside air flows into the riding space from the upper half of the riding space to decrease temperature in the riding space. It is thus difficult to adjust the thermal environment in the vehicle.

SUMMARY OF THE INVENTION

In view of the above, an object of the present invention is to provide a door that enables adjustment of the thermal environment in a vehicle according to conditions of outside air and the inside of the vehicle.

In order to achieve the object mentioned above, according to a first aspect of the present invention, a door of a utility vehicle includes:

a door body including a grip portion utilized for opening and closing the door;

an attachment portion provided to the door body; and a replaceable portion detachably attached to the attachment portion and enabling visual recognition from inside to outside the vehicle.

The replaceable portion is detachably attached to the attachment portion in this configuration. When the replaceable portion is replaced, the thermal environment in the vehicle can be adjusted in accordance with the outside air condition. The replaceable portion enables visual recognition from inside to outside the vehicle. A crew in a riding space can thus visually recognize the outside of the vehicle through the replaceable portion.

The door of a utility vehicle according to the first aspect of the present invention preferably includes any of the following configurations.

(1) The replaceable portion is provided as a net member or a plate member.

(2) The attachment portion is attached to the door body, and includes a front frame member, a rear frame member, and an upper frame member connecting an upper end of the front frame member and an upper end of the rear frame member, the front frame member has a lower end attached to a position ahead of a center of the door body in an anteroposterior direction, and extends upward from the lower end of the front frame member, the rear frame member has a lower end attached to a position behind the center of the door body in the anteroposterior direction, and extends upward from the lower end of the rear frame member substantially along a R.O.P.S. of a utility vehicle, the upper frame member is located at a position lower than an uppermost position of the R.O.P.S. and is slanted downward toward a front end, and the replaceable portion covers a range surrounded with the door body, the front frame member, the rear frame member, and the upper frame member.

In the configuration (1), the replaceable portion provided as the net member enables ventilation through the replaceable portion. The replaceable portion provided as the plate member can prevent outside air from entering through the replaceable portion.

In the configuration (2), the front frame member, the rear frame member, and the upper frame member allow the replaceable portion to be located in an appropriate range in view of a crew.

According to a second aspect of the present invention, a door of a utility vehicle includes:

a door body including a grip portion utilized for opening and closing the door; and an open-close portion provided to the door body and configured to be opened and closed.

In this configuration, when the open-close portion of the door body is opened or closed, the thermal environment in the vehicle can be adjusted in accordance with the outside air condition. This configuration can achieve adjustment of the thermal environment particularly at the lower portion in the vehicle, where the door body is located.

The door of a utility vehicle according to the second aspect of the present invention preferably includes any of the following configurations.

(3) The open-close portion slides to be opened and closed.

(4) The open-close portion includes a hinge utilized for opening outward from the vehicle.

(5) The open-close portion is configured to be attached to and detached from the door body.

The configurations (3) to (5) each provide the open-close portion according to a specific example, and each can easily achieve an open-close structure of the open-close portion.

According to a third aspect of the present invention, a utility vehicle includes the door according to the first or second aspect.

This configuration achieves provision of a utility vehicle including a door that enables adjustment of the thermal environment in the vehicle according to conditions of outside air and the inside of the vehicle.

In summary, the present invention can provide a door that enables adjustment of the thermal environment in a vehicle according to conditions of outside air and the inside of the vehicle.

DETAILED DESCRIPTION OF THE INVENTION

First Embodiment

Entire Structure of Vehicle

Figure 1:
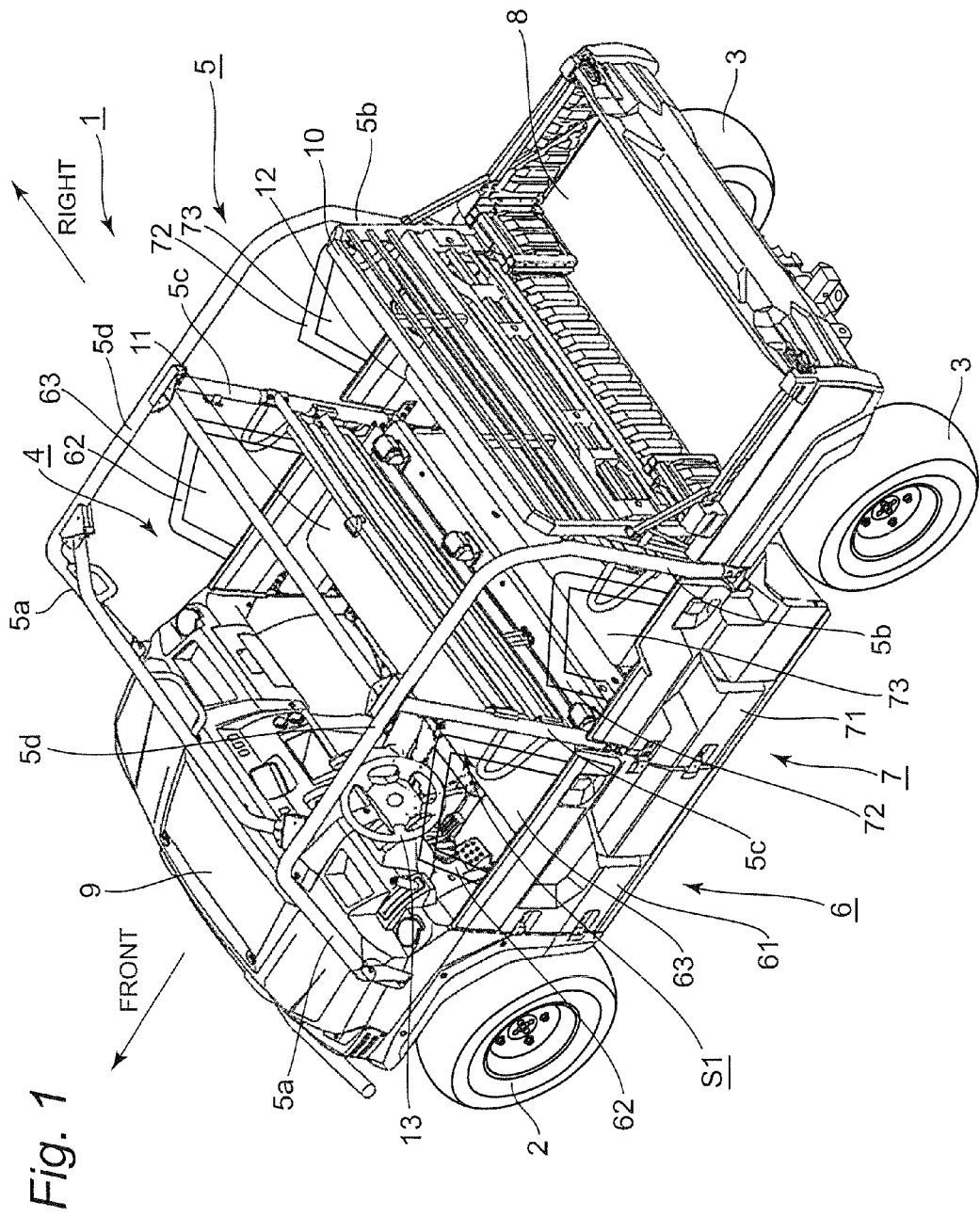
FIG. 1 is a perspective view of a utility vehicle including a door according to a first embodiment of the present invention.
Figure 2:
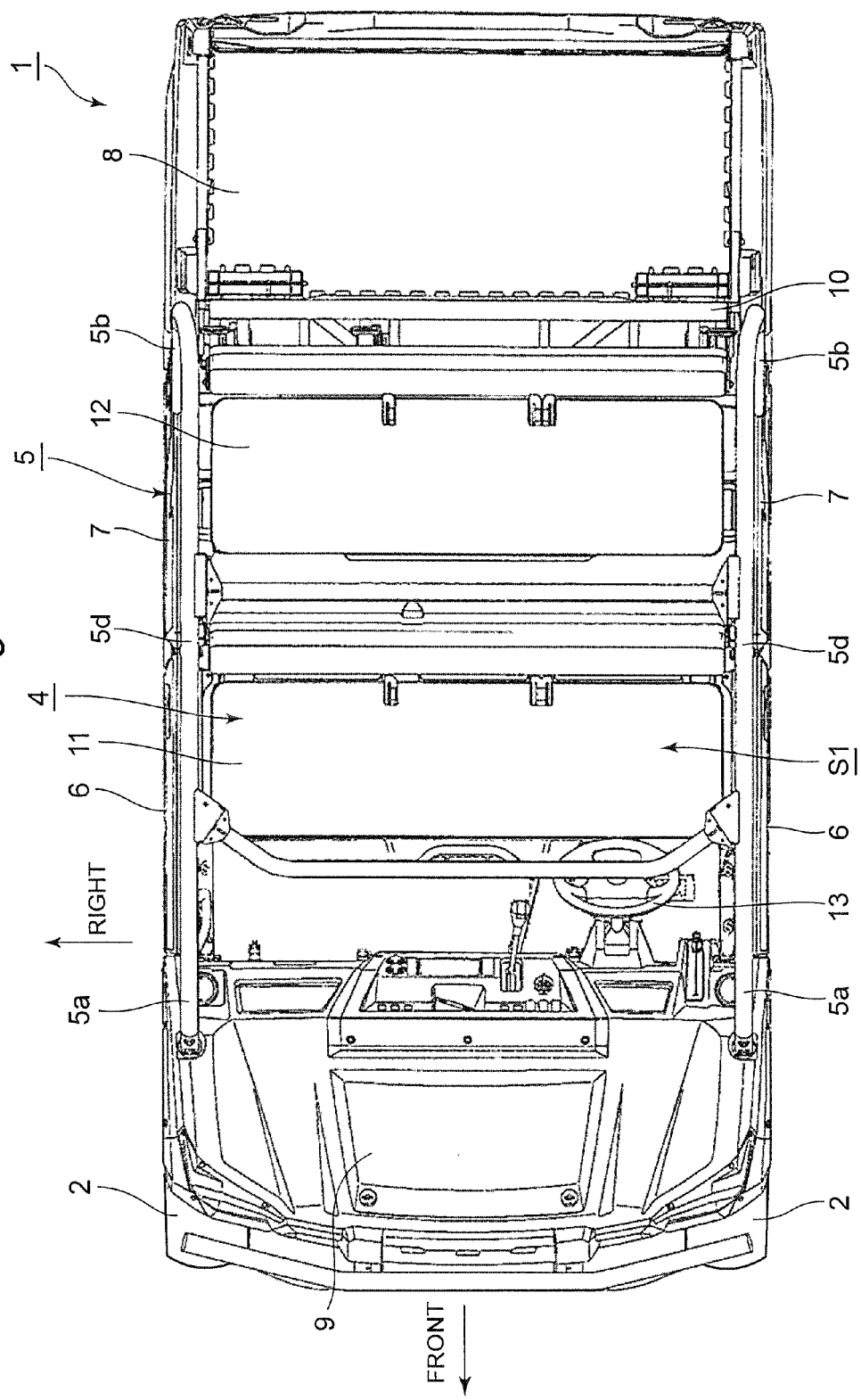
FIG. 2 is a top view of the utility vehicle shown in FIG. 1.
Figure 3:
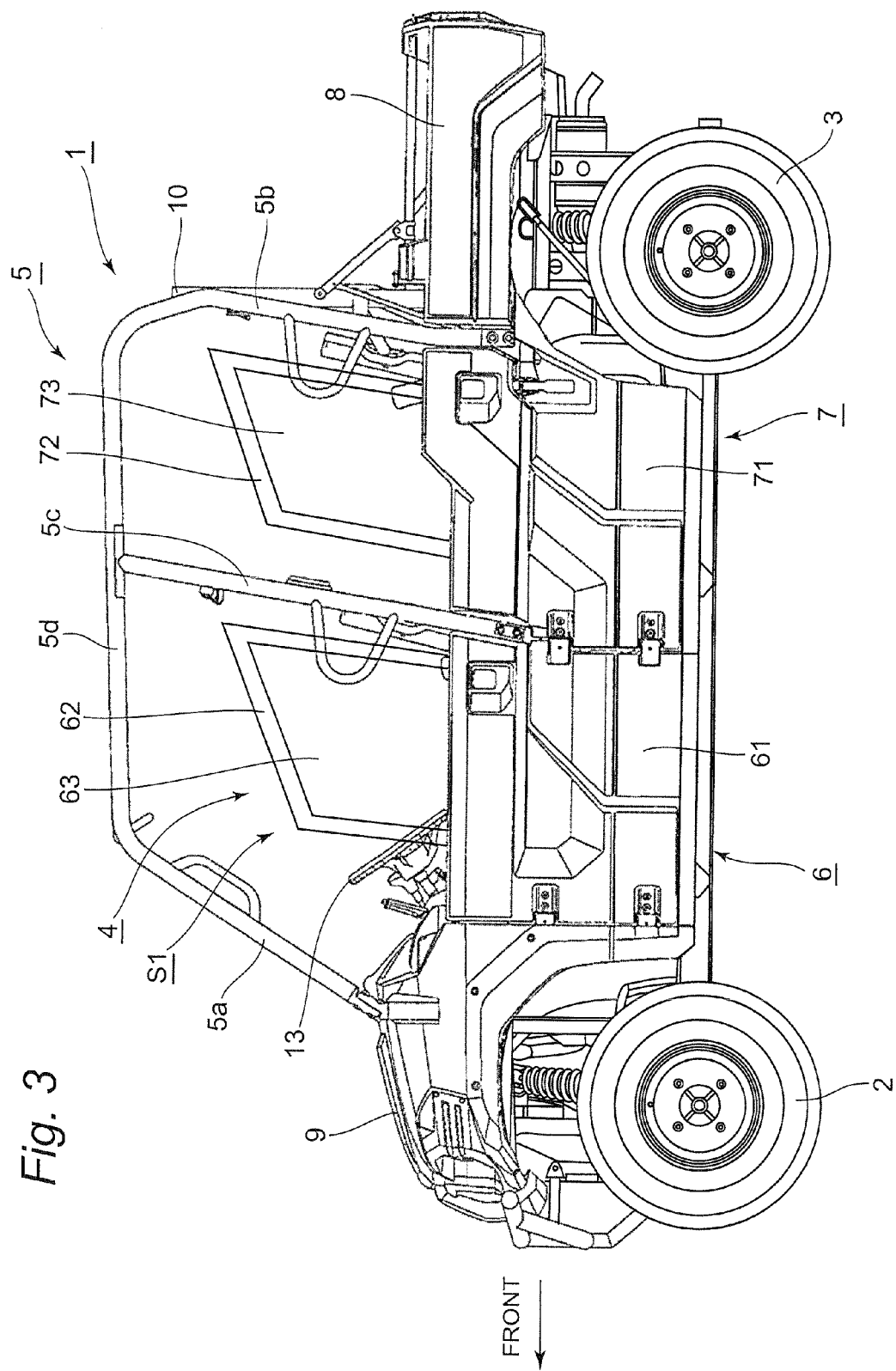
FIG. 3 is a left side view of the utility vehicle shown in FIG. 1.

FIG. 1 is a perspective view of a utility vehicle including a door according to the first embodiment of the present invention. Assume that the concept of directions according to the present embodiment matches the concept of directions viewed from a driver of the utility vehicle. FIG. 2 is a top view of the utility vehicle shown in FIG. 1. FIG. 3 is a left side view of the utility vehicle shown in FIG. 1.

As shown in FIGS. 1 to 3, a utility vehicle 1 includes a pair of right and left front wheels 2 at a vehicle front portion, a pair of right and left rear wheels 3 at a vehicle rear portion, and a riding space (cabin) 4 between the front wheels 2 and the rear wheels 3. The riding space 4 is surrounded with a R.O.P.S. 5, a pair of right and left front doors 6, and a pair of right and left rear doors 7. The R.O.P.S. is an abbreviation for a rollover protective structure. The R.O.P.S. 5 configures part of a chassis frame, and includes a pair of right and left front vertical members 5a, a pair of right and left rear vertical members 5b, a pair of right and left intermediate vertical members 5c provided between the front vertical members 5a and the rear vertical members 5b, and a plurality of upper end beam members 5d connecting the upper ends of the vertical members 5a, 5b, and 5c. The riding space 4 is provided therebehind with a cargo bed 8, and is provided thereahead with a bonnet 9. The cargo bed 8 is provided, at the front end, with a screen 10 that partitions between the riding space 4 and the cargo bed 8. The front half of the riding space 4 is provided with a front bench seat 11 and the rear half of the riding space 4 is provided with a rear bench seat 12. The front seat 11 has a left seat region S1 serving as a driver's seat. The left seat region S1 is provided thereahead with an operation unit including a steering wheel 13 and the like.

Structure of Front Door

Figure 4:
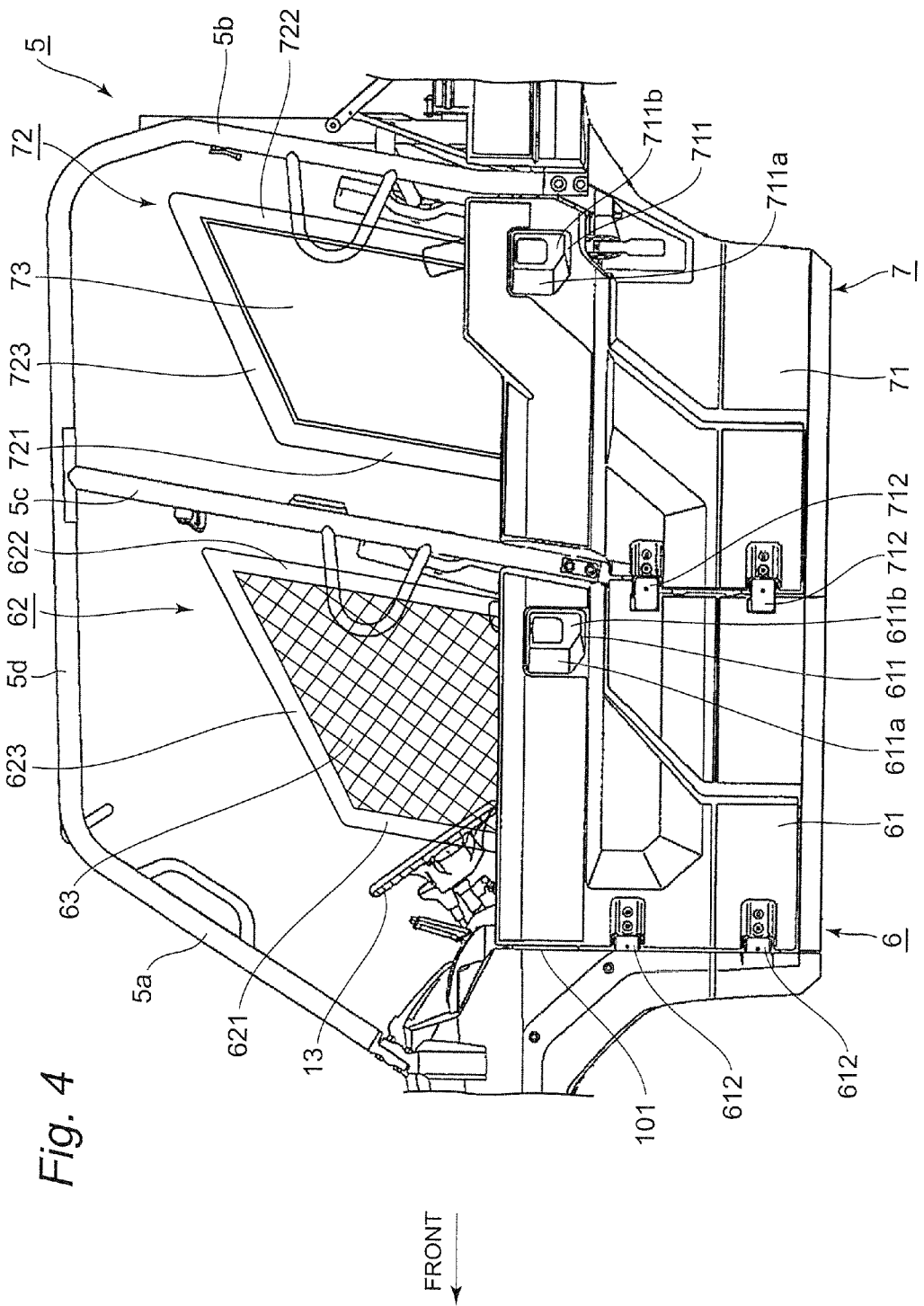
FIG. 4 is a left side view of a front door, a rear door, and the periphery.

FIG. 4 is a left side view of the front door 6, the rear door 7, and the periphery. As shown in FIG. 4, the front door 6 includes a front door body 61 having a grip portion 611 utilized for opening and closing the front door 6, an attachment portion 62 provided to the front door body 61, and a replaceable portion 63 detachably attached to the attachment portion 62 and enabling visual recognition from inside to outside the vehicle.

The front door body 61 is provided, at the front end, with two hinges 612 aligned in the vertical direction, and is attached to a front frame 101 supporting the bonnet 9 by the hinges 612. The front door body 61 can be opened outward in the vehicle width direction about a rotation axis configured by the hinges 612. The attachment portion 62 is provided to the front door body 61 and the replaceable portion 63 is attached to the attachment portion 62. When the front door body 61 is opened outward in the vehicle width direction about the rotation axis configured by the hinges 612, the front door 6 including the front door body 61, the attachment portion 62, and the replaceable portion 63 is opened outward in the vehicle width direction.

The grip portion 611 is provided on the outer surface of an upper rear portion of the front door body 61. The grip portion 611 has a grip part 611a configured to be gripped by a hand of a crew, and a recess part 611b configured to allow the hand gripping the grip part 611a to be partially inserted thereto. A crew grips the grip portion 611 to open and close the front door 6. The grip portion 611 has a locking function of locking the front door body 61 to a closed state.

The attachment portion 62 is attached to the upper end of the front door body 61, and includes a front frame member 621, a rear frame member 622, and an upper frame member 623 connecting the upper end of the front frame member 621 and the upper end of the rear frame member 622. The lower end of the front frame member 621 is attached to a position ahead of the center of the front door body 61 in the anteroposterior direction, and the front frame member 621 extends upward from the lower end of the front frame member 621. The lower end of the front frame member 621 is located near the front end of the front seat 11 and near the steering wheel 13 in the anteroposterior direction. More specifically, the lower end of the front frame member 621 is located between the front end of the steering wheel 13 and the front end of the front seat 11 in the anteroposterior direction.

The lower end of the rear frame member 622 is attached to a position behind the center of the front door body 61 in the anteroposterior direction, and the rear frame member 622 extends upward from the lower end of the rear frame member 622, substantially along the intermediate vertical members 5c of the R.O.P.S. 5. The rear frame member 622 is slanted from the horizontal plane at an angle substantially equal to a slant angle of the front frame member 621 from the horizontal plane.

The upper frame member 623 is located at a position lower than the uppermost position of the R.O.P.S. 5, and is slanted downward toward the front end. Because the upper frame member 623 is slanted as described above, the rear frame member 622 has a vertical length longer than that of the front frame member 621.

The replaceable portion 63 covers a range surrounded with the front door body 61, the front frame member 621, the rear frame member 622, and the upper frame member 623. The replaceable portion 63 is provided as a net member, a plate member, or the like. FIG. 4 shows the replaceable portion 63 that is provided as the net member.

In the case where the replaceable portion 63 is provided as the net member as shown in FIG. 4, the net member is detachably attached to the front frame member 621, the rear frame member 622, and the upper frame member 623 by hooks, fasteners, or the like. The net member is formed by connecting thread members or the like into a mesh shape. When the meshes are sized appropriately, visual recognition from inside to outside the vehicle is achieved through the net member.

Structure of Rear Door

The rear door 7 includes a rear door body 71 having a grip portion 711 utilized for opening and closing the rear door 7, an attachment portion 72 provided to the rear door body 71, and a replaceable portion 73 detachably attached to the attachment portion 72 and enabling visual recognition from inside to outside the vehicle.

The rear door body 71 is provided, at the front end, with two hinges 712 aligned in the vertical direction, and is attached to corresponding one of the intermediate vertical members 5c of the R.O.P.S. 5 by the hinges 712. The rear door body 71 can be opened outward in the vehicle width direction about a rotation axis configured by the hinges 712. The attachment portion 72 is provided to the rear door body 71 and the replaceable portion 73 is attached to the attachment portion 72. When the rear door body 71 is opened outward in the vehicle width direction about the rotation axis configured by the hinges 712, the rear door 7 including the rear door body 71, the attachment portion 72, and the replaceable portion 73 is opened outward in the vehicle width direction.

The grip portion 711 is provided on the outer surface of an upper rear portion of the rear door body 71. The grip portion 711 has a grip part 711a configured to be gripped by a hand of a crew, and a recess part 711b configured to allow the hand gripping the grip part 711a to be partially inserted thereto. A crew grips the grip portion 711 open and close the rear door 7. The grip portion 711 has a locking function of locking the rear door body 71 to a closed state.

The attachment portion 72 is attached to the upper end of the rear door body 71, and includes a front frame member 721, a rear frame member 722, and an upper frame member 723 connecting the upper end of the front frame member 721 and the upper end of the rear frame member 722. The lower end of the front frame member 721 is attached to a position ahead of the center of the rear door body 71 in the anteroposterior direction, and the front frame member 721 extends upward from the lower end of the front frame member 721. The lower end of the front frame member 721 is located near the front end of the rear seat 12 in the anteroposterior direction.

The lower end of the rear frame member 722 is attached to a position behind the center of the rear door body 71 in the anteroposterior direction, and the rear frame member 722 extends upward from the lower end of the rear frame member 722, substantially along the rear vertical members 5b of the R.O.P.S. 5. The rear frame member 722 is slanted from the horizontal plane at an angle substantially equal to a slant angle of the front frame member 721 from the horizontal plane.

The upper frame member 723 is located position lower than the uppermost position of the R.O.P.S. 5, and is slanted downward toward the front end. Because the upper frame member 723 is slanted as described above, the rear frame member 722 has a vertical length longer than that of the front frame member 721.

The replaceable portion 73 covers a range surrounded with the rear door body 71, the front frame member 721, the rear frame member 722, and the upper frame member 723. The replaceable portion 73 is provided as a net member, a plate member, or the like. The plate member includes a plastic member, a glass member, and the like. FIG. 4 shows the replaceable portion 73 that is provided as the plastic member.

In the case where the replaceable portion 73 is provided as the plastic member as shown in FIG. 4, the plastic member is detachably attached to the front frame member 721, the rear frame member 722, and the upper frame member 723 by hooks, fitting, or the like. In the case where the plastic member is fitted and attached to the attachment portion 72, the frame members are each provided with a fitting groove for the plastic member. The plastic member has transparency enabling visual recognition from inside to outside the vehicle through the plastic member. The replaceable portion can be provided as a glass member or the like which enables visual recognition therethrough.

The front and rear doors 6 and 7 thus configured can achieve the following effects.

(1) The replaceable portions 63 and 73 are detachably attached to the attachment portions 62 and 72, respectively. When the replaceable portions 63 and 73 are replaced, the environment in the vehicle can thus be adjusted in accordance with the outside air condition. The replaceable portions 63 and 73 enable visual recognition from inside to outside the vehicle. A crew in the riding space 4 can thus visually recognize the outside of the vehicle through the replaceable portions 63 and 73.

(2) The replaceable portion 63 provided as the net member enables ventilation through the replaceable portion 63. The replaceable portion 73 provided as the plastic member can prevent outside air from entering through the replaceable portion 73.

(3) The attachment portions 62 and 72 to which the replaceable portions 63 and 73 are attached include the front frame members 621 and 721, the rear frame members 622 and 722, and the upper frame members 623 and 723, respectively. The front frame members 621 and 721 extend upward from the lower ends of the front frame members 621 and 721, respectively. The rear frame members 622 and 722 extend upward from the lower ends of the rear frame members 622 and 722, substantially along the intermediate vertical members 5c and the rear vertical members 5b of the R.O.P.S. 5, respectively. The upper frame members 623 and 723 are slanted downward toward the front ends. The front frame members 621 and 721, the rear frame members 622 and 722, and the upper frame members 623 and 723 thus allow the replaceable portions 63 and 73 to be located in appropriate ranges in view of a crew, respectively.

(4) The upper frame members 623 and 723 are located at positions lower than the uppermost position of the R.O.P.S. 5 and are slanted downward toward the front ends. When a crew sitting at the front seat 11 or the rear seat 12 visually checks the outside of the vehicle, the upper frame members 623 and 723 are unlikely to intervene in the line of sight of the crew.

According to the embodiment described above, the replaceable portion 63 is provided as the net member whereas the replaceable portion 73 is provided as the plastic member. Alternatively, the replaceable portion 63 can be provided as a plastic member whereas the replaceable portion 73 can be provided as a net member. Still alternatively, both the replaceable portion 63 and the replaceable portion 73 can be provided as net members or plastic members. Further alternatively, one of the pair of right and left replaceable portions 63 can be provided as a net member and the other one can be provided as a plastic member. Similarly, one of the pair of right and left replaceable portions 73 can be provided as a net member and the other one can be provided as a plastic member.

The above embodiment exemplifies the case where the replaceable portion 63 and the replaceable portion 73 are provided as the net member or the plate member. The replaceable portion 63 and the replaceable portion 73 are not limited to the net member and the plate member, but can be each provided as a member enabling visual recognition from inside to outside the vehicle through the replaceable portion.

According to the above embodiment, the upper frame members 623 and 723 are slanted downward toward the front ends. Alternatively, the upper frame members can extend horizontally and the front frame members can be slanted downward toward the front ends.

According to the above embodiment, the upper frame member 623 connects the upper end of the front frame member 621 and the upper end of the rear frame member 622, and the lower end of the front frame member 621 is attached to the front door body 61. Furthermore, the upper frame member 723 connects the upper end of the front frame member 721 and the upper end of the rear frame member 722, and the lower end of the front frame member 721 is attached to the rear door body 71. Alternatively, the attachment portion can include a lower frame member that connects the lower end of the front frame member and the lower end of the rear frame member and the lower frame member can be attached to the door body. In this case, the replaceable portion can cover a range surrounded with the door body, the front frame member, the rear frame member, and the upper frame member, or can cover a range surrounded with the lower frame member, the front frame member, the rear frame member, and the upper frame member.

According to the above embodiment, the attachment portion 62 is attached to the front door body 61 and the attachment portion 72 is attached to the rear door body 71. Alternatively, the attachment portion can be provided integrally with the door body.

Second Embodiment

Figure 5:
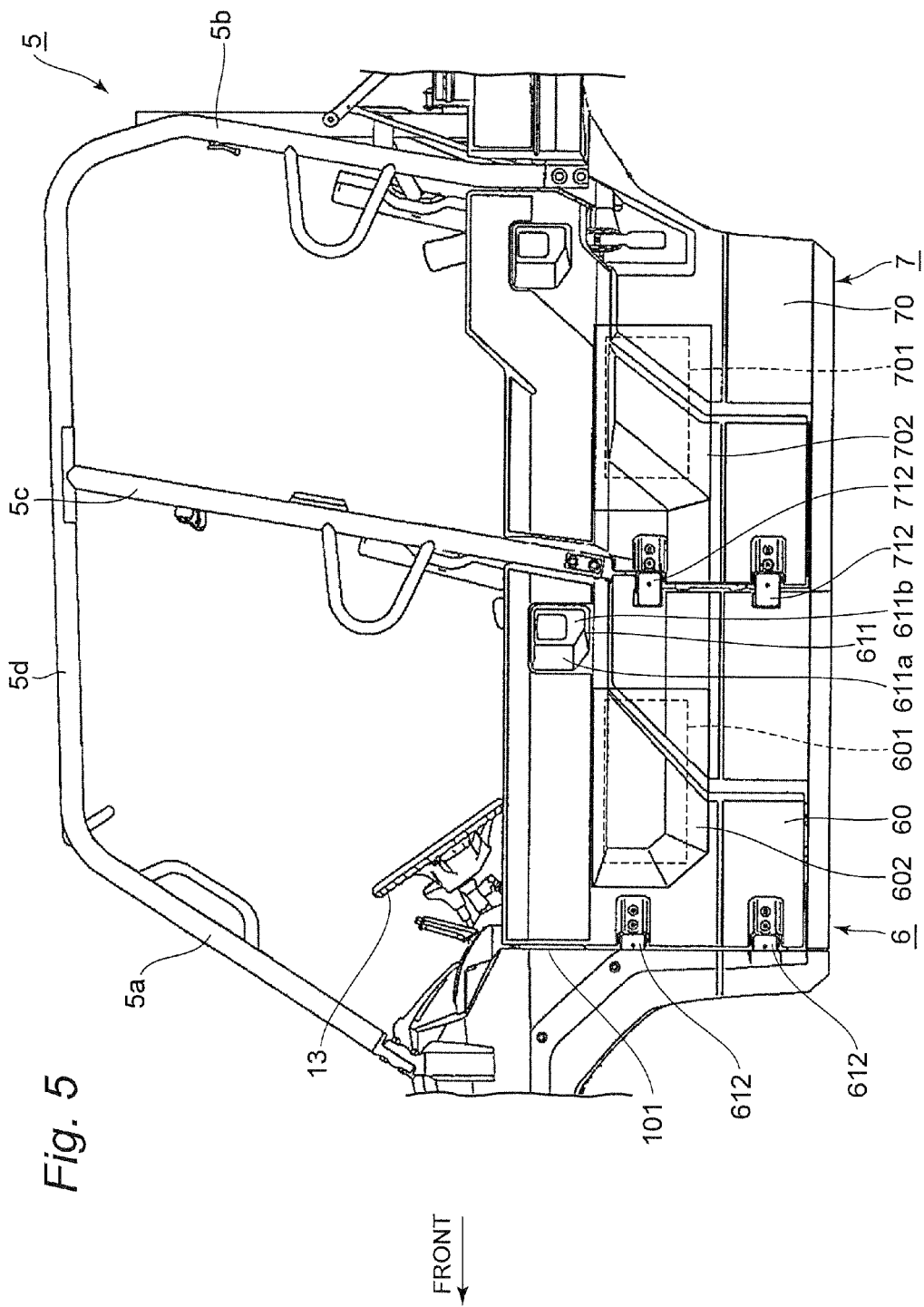
FIG. 5 is a left side view of a front door, a rear door according to a second embodiment.

FIG. 5 is a left side view of a front door 6, a rear door 7, and the periphery, according to the second embodiment. In the first embodiment, the attachment portion is provided to the door body and the replaceable portion is attached to the attachment portion. The second embodiment is different from the first embodiment in that the door includes neither the attachment portion nor the replaceable portion but the door body is provided with an open-close portion. The remaining configurations are the same as those according to the first embodiment. In the description of the second embodiment, the components and portions same as those of the first embodiment are denoted by the same reference signs, and will not be detailed repeatedly.

As shown in FIG. 5, a front door body 60 has an opening 601 at the center in the anteroposterior direction as well as in the vertical direction, and an open-close portion 602 configured to open and close the opening 601. Similarly, a rear door body 70 has an opening 701 at the center in the anteroposterior direction as well as in the vertical direction, and an open-close portion 702 configured to open and close the opening 701. The present embodiment exemplifies the case where the front door body 60 is provided with the opening 601 and the open-close portion 602 and the rear door body 70 is provided with the opening 701 and the open-close portion 702. Alternatively, the opening and the open-close portion can be provided to any one of the pair of right and left front door bodies 60 and the pair of right and left rear door bodies 70, to a plurality of door bodies, or to all of the door bodies. Exemplified below is a case where the left front door body 60 is provided with the opening 601 and the open-close portion.

Figure 6:
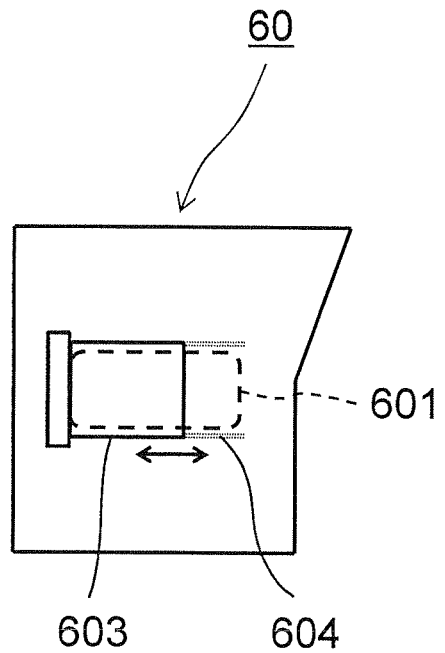
FIG. 6 is a schematic view of a front door body provided with an open-close portion according to a specific example.
Figure 7:
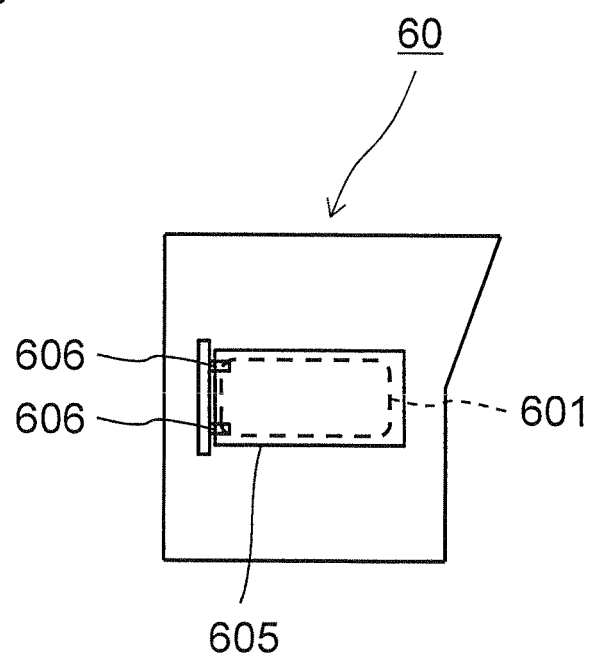
FIG. 7 is a schematic view of a front door body provided with an open-close portion according to another specific example.
Figure 8:
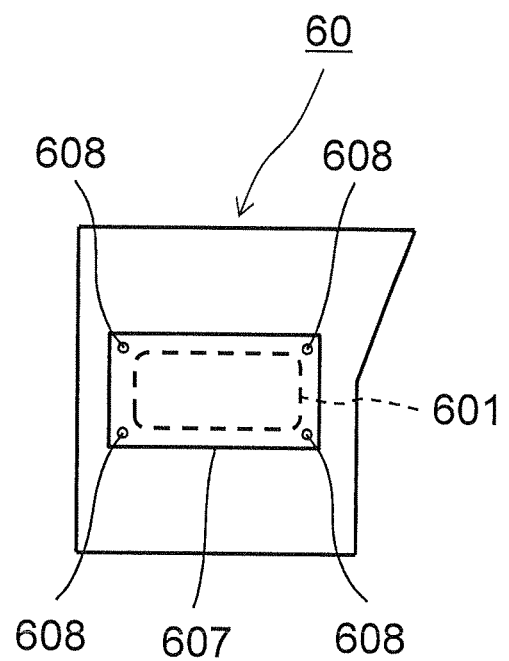
FIG. 8 is a schematic view of a front door body provided with an open-close portion according to still another specific example.

FIGS. 6 to 8 are schematic views each showing the front door body 60 provided with an open-close portion according to a specific example. As shown in FIG. 6, an open-close portion 603 is configured to slide along the opening 601 so as to open and close the opening 601. Specifically, the opening 601 is provided, at the outer edge, with a groove 604 along which the open-close portion 603 can slide. The open-close portion 603 slides in the vehicle anteroposterior direction in the present embodiment. The open-close portion 603 can alternatively slide in the vertical direction.

As shown in FIG. 7, an open-close portion 605 can be attached to the front door body 60 by hinges 606 near the front end of the opening 601 so as to open and close the opening 601. The open-close portion 605 can be opened outward in the vehicle width direction about a rotation axis configured by the hinges 606.

As shown in FIG. 8, an open-close portion 607 can be attached to and detached from the front door body 60 so as to cover the opening 601 that can be opened and closed. The open-close portion 607 according to the present embodiment is attached to the front door body by bolts 608. The opening 601 can be closed by attaching the open-close portion 607 to the front door body 60 so as to cover the opening 601, whereas the opening 601 can be opened by detaching the open-close portion 607.

The front door body 60 thus configured can achieve the following effects.

(1) The front door body 60 has the open-close portion 602, 603, 605, or 607 configured to open and close the opening 601. The environment in the vehicle can be adjusted in accordance with the outside air condition by opening or closing the open-close portion 602, 603, 605, or 607. This configuration can achieve adjustment of the environment particularly at the lower portion in the vehicle, where the front door body 60 is located.

(2) The open-close portion 603 slides to open and close the opening 601, and can thus have its open-close structure configured easily. The open-close portion 603 can be prevented from projecting outward in the vehicle width direction when opened. Furthermore, the opening 601 can be opened and closed easily, and an open area of the opening 601 can be thus adjusted.

(3) The open-close portion 605 is configured to open and close the opening 601 with respect to the hinges 606, and can thus have its open-close structure configured easily. Furthermore, the opening 601 can be opened and closed easily, and an outward open angle in the vehicle width direction of the open-close portion 605 can be thus adjusted.

(4) The open-close portion 607 can be attached to and detached from the front door body 60 by the bolts 608, and can thus have its open-close structure configured easily.

According to the above embodiment, none of the front door 6 and the rear door 7 includes the attachment portion or the replaceable portion. Alternatively, the front door 6 and the rear door 7 can each include the attachment portion and the replaceable portion, and the front and rear door bodies 60 and 70 can include the open-close portions 602 and 702, respectively.

According to the above embodiment, the openings 601 and 701 are provided at the centers in the anteroposterior direction and the vertical direction of the front and rear door bodies 60 and 70, respectively. The positions of the openings 601 and 701 are not limited to the above configurations, and the openings 601 and 71 can be provided at appropriate positions on the front and rear door bodies 60 and 70, respectively.

The present invention can be modified or changed in various manners without departing from the spirit and scope of the present invention recited in the following patent claims.

The invention claimed is:

1. A door of a utility vehicle, comprising:
    a door body including a grip portion utilized for opening and closing the door;
    an attachment portion only provided on the door body; and
    a replaceable portion detachably attached to the attachment portion and enabling visual recognition from inside to outside the vehicle,
    wherein the door body, the attachment portion and the replacement portion are opened when the door body is opened.

2. The door according to claim 1, wherein the replaceable portion comprises a net member or a plate member.

3. The door according to claim 1, wherein:
the attachment portion is attached to the door body, and includes a front frame member, a rear frame member, and an upper frame member connecting an upper end of the front frame member and an upper end of the rear frame member;
the front frame member has a lower end attached to a position ahead of a center of the door body in an anteroposterior direction, and extends upward from the lower end of the front frame member;
the rear frame member has a lower end attached to a position behind the center of the door body in the anteroposterior direction, and extends upward from the lower end of the rear frame member substantially along a R.O.P.S. of a utility vehicle;
the upper frame member is located at a position lower than an uppermost position of the R.O.P.S. and is slanted downward toward a front end; and
the replaceable portion covers a range surrounded with the door body, the front frame member, the rear frame member, and the upper frame member.

4. A door of a utility vehicle, comprising:
a door body including a grip portion utilized for opening and closing the door,
wherein the door body has an opening formed therein and an open-close portion mounted in the opening and configured to open and close the opening.

5. The door according to claim 4, wherein the open-close portion slides to be opened and closed.

6. The door according to claim 4, wherein the open-close portion includes a hinge utilized to permit movement of the open-close portion outward from the vehicle.

7. The door according to claim 4, wherein the open-close portion is configured to be attached to and detached from the door body.

8. A utility vehicle comprising a door that comprises:
a door body including a grip portion utilized for opening and closing the door;
an attachment portion mounted only on the door body; and
a replaceable portion detachably attached to the attachment portion and enabling visual recognition from inside to outside the vehicle,
wherein the door body, the attachment portion and the replacement portion are opened when the door body is opened.

9. A utility vehicle comprising a door that comprises:
a door body including a grip portion utilized for opening and closing the door,
wherein the door body has an opening formed therein and an open-close portion mounted in the opening and configured to open and close the opening.

* * * * *